(12) United States Patent
Hodnett (10) Patent No.: US 6,510,922 B1
(45) Date of Patent: Jan. 28, 2003

(54) HUNTING STAND AND BLIND (76) Inventor: John Hodnett, Rte. 1, Box 1423, Shell Knob, MO (US) 65747

( * ) Notice: Subject to any disclaimer, the term of this patent is extended or adjusted under 35 U.S.C. 154(b) by 0 days.

(21) Appl. No.: 09/840,619

(22) Filed: Apr. 23, 2001

(51) Int. Cl.[7] .................................................. E04G 3/00
(52) U.S. Cl. ...................... 182/187; 182/135; 182/188; 135/90; 135/901
(58) Field of Search .................. 182/129, 135, 182/187, 188; 135/90, 901

(56) References Cited

U.S. PATENT DOCUMENTS

| | | | | |
|---|---|---|---|---|
| 3,116,808 A | * | 1/1964 | Riley | 182/187 |
| 3,358,789 A | * | 12/1967 | Laun | 182/187 |
| 3,990,536 A | * | 11/1976 | Wilburn | 182/187 X |
| 4,134,474 A | * | 1/1979 | Stavenau | 182/187 |
| 4,410,066 A | * | 10/1983 | Swett | 182/187 X |
| 5,143,177 A | * | 9/1992 | Smith | 182/187 |
| 5,327,994 A | * | 7/1994 | Smith | 182/187 |
| 5,482,137 A | * | 1/1996 | McNeill | 182/187 |
| 5,490,350 A | * | 2/1996 | Eisenschenk et al. | 47/40.5 |
| 5,613,512 A | * | 3/1997 | Bean | 135/90 |
| 5,628,437 A | * | 5/1997 | Kober | 182/187 X |
| 5,975,242 A | * | 11/1999 | Woller et al. | 182/187 |
| 5,975,389 A | * | 11/1999 | Braun et al. | 182/187 X |
| 6,202,665 B1 | * | 3/2001 | O'Hare | 135/90 |
| 6,296,002 B1 | * | 10/2001 | Tashchyan | 135/90 X |

* cited by examiner

Primary Examiner—Bruce A. Lev
(74) Attorney, Agent, or Firm—Fellers, Snider, Blankenship, Bailey & Tippens (57) ABSTRACT

A stand for hunting or photography comprising: (a) a seat structure adapted to be removably positionable on a tree trunk and (b) a cover removably supportable by the seat structure in a manner effective for at least partially concealing a user when seated in the seat structure from front view, side view, back view, or a combination thereof.

18 Claims, 7 Drawing Sheets

HUNTING STAND AND BLIND

FIELD OF THE INVENTION

The present invention relates to portable and carryable stands and blinds for hunting.

BACKGROUND OF THE INVENTION

A need presently exists for a stand and blind which can be easily carried to generally any desired location and which is well suited for hunting, observing, or photographing deer, ducks, or generally any other type of game. A need particularly exists for a hunting stand which can be secured to a tree trunk and which will be effective for hunting, photography, etc., even when positioned close to the ground. The ability to effectively use the stand when positioned close to the ground would be particularly desirable for certain types of hunting and/or for older users or others who may have difficulty installing and/or climbing into an elevated stand.

SUMMARY OF THE INVENTION

The present invention provides a stand for hunting or photography which satisfies the needs and alleviates the problems mentioned hereinabove. In one aspect, the inventive stand comprises: (a) a seat structure adapted to be removably positionable on a tree trunk and (b) a cover removably supportable by the seat structure in a manner effective for at least partially concealing a user when seated on said seat structure from at least one of a front view, a side view, a back view, or a combination thereof. The cover is preferably a soft camouflage cover.

In another aspect, the present invention provides a stand for hunting or photography comprising: a carryable seat structure adapted to be removably positionable on a tree trunk; a soft cover; and at least one arm extendable from the seat structure for supporting the soft cover in a manner effective for at least partially concealing a user when seated on said seat structure from at least one of a front view, a side view, a back view, or a combination thereof. The stand preferably comprises a plurality of arms pivotably extendable from the seat structure and a plurality of rods removably extendable from the arms such that the soft cover is positionable on the rods for supporting the soft cover.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

An embodiment 2 of the stand provided by the present invention is depicted in FIGS. 1–5. Inventive stand 2 preferably comprises: a seat frame 4 having a seat 6 thereon; a vertical cover 5 extendable around at least a portion of seat frame 4 for concealing a user 8 sitting in seat 6; a plurality of cover support arms 10 pivotably extendable from seat frame 4; a plurality of cover attachment rods 15 removably receivable in support arms 10; an attachment 14 extendable from the rear of seat frame 4 for positioning around a tree trunk 40; a blade assembly 16 projecting from the rear of seat frame 4; a foot rest 18 pivotably attached to the front of seat frame 4; and shoulder straps 20 attachable to the bottom of seat frame 4 for carrying the inventive hunting stand 2 in a manner depicted in FIG. 3.

The particular seat frame 4 employed in embodiment 2 of the inventive hunting stand comprises: a U-shaped support 22 having sides 24, a lateral back piece 26 and an open front 28; a pair of vertical supports 30 extending upwardly from the rearward portion of U-shaped support 22; and a pair of opposing, curved side pieces 32.

Curved side pieces 32 can be shaped to provide comfortable arm rest supports for the user 8 and preferably comprise: curved forward end portions 34 which are attached to and preferably extend downwardly beyond the forward ends of the side pieces 24 of U-shaped support 22; rearwardly extending, and preferably upwardly angled, upper segments 35 which are attached to and preferably extend rearwardly beyond the vertical supports 30; and a plurality of lateral holes or other apertures 36 provided in series in the rearward portions of top segments 35 for adjustably retaining the attachment 14 to accommodate tree trunks 40 of different diameter. Arm rest pads 33 are preferably provided on side pieces 22 for the user's comfort.

To facilitate carrying and installation, frame 4 is preferably formed of a sturdy but lightweight material. Frame 4 will preferably be formed of tubular metal and will most preferably be formed from sturdy, tubular aluminum.

The seat 6 is preferably retained on the U-shaped support piece 22 of frame 4 and can generally be any type of structure or cover capable of supporting the user 8. Seat 6 is preferably formed of cloth, canvass, fabric, plastic, or other lightweight material. A plurality of eyelets of similar structures 38 are provided in seat 6 for securing seat 6 in frame 4 using, for example, ropes or cords 42.

To support the forward end of seat 6 and prevent excessive sagging, an elongate strap or similar structure 44 is preferably attached across the forward end of seat 6. The ends of strap 44 extend over and around the lower side pieces 24 of seat frame 4 and are attached together by a buckle or other attachment structure 46. The attachment structure 46 will preferably be of a type which will allow the attachment of strap 44 on seat frame 4 to be tightened or loosened as desired.

Foot rest 18 can generally be any type of structure capable of supporting the user's feet and will preferably be pivotably or collapsibly attached to seat frame 4 such that foot rest 18 can be folded or otherwise moved out of the way for carrying. Foot rest 18 preferably comprises a U-shaped member 48 having outwardly extending or tapered sides 50 and a pair of attachment bolts or similar structures 52 for pivotably attaching the sides 50 of foot rest 18 to seat frame 4. By tightening or loosening bolts 52, foot rest 18 can be selectively held in or moved to and from its operating position 54 depicted in FIGS. 1 and 2 and its folded or carrying position 56 depicted in FIGS. 3 and 5. Bolts 52 preferably have enlarged knobs, wings, or other structures 58 on the outer ends thereof so that they can be easily tightened or loosened by hand. Foot rest 18 also preferably comprises a grate, plate, or similar structure 60 attached to the lower end of U-shaped member 48 to provide a wider, more comfortable support for the user's feet.

To further assist in securing foot rest 18 in its unfolded, operating position 54, inventive apparatus 2 can also include a pair of locking pins 25. Locking pins 25 are removably received through apertures (not shown) provided through the upper portions of foot rest side pieces 50 and through the downwardly projecting segments 34 of frame side pieces 32. As will be understood by those skilled in the art, each of locking pins 25 preferably includes a spring wire or similar structure 62 which is pivotably attached to one end of the pin and can be flexed outwardly for placement over the other end of the pin to thus lock the pin 25 in place. Pins 25 of this type are preferably used for both locking foot rest 18 in operating position 54 and adjustably securing the ends of attachment structure 14 to the rearwardly projecting portions of frame side pieces 32.

Attachment structure 14 can generally be any type of structure which will extend around tree trunk 40 for holding the inventive stand 2 in cantilevered position. Attachment 14 will preferably a flexible structure such as a cable, a chain, an implement-type sprocket chain, a rope, or a cord. Attachment 14 will preferably be a cable, chain, or sprocket chain having a plastic sheath 54 on the exterior thereof. Loops or other structures can be provided in the ends of attachment structure 14 for securing the attachment structure to frame 4 using locking pins 25 or other attachment devices.

The blade assembly 16 employed in inventive stand 2 preferably extends from the back 26 of frame piece 22 such that blade assembly 16 is spaced below, and will thus operate in conjunction with, attachment piece 14 to hold seat frame 4 in cantilevered position on tree trunk 40. Blade assembly 16 preferably comprises: (a) a pair of fixed plates or similar structures 68 which project rearwardly from frame piece 26 and (b) a pair of blades 70 pivotably attached on fixed plates 68 using pins, bolts, or other attachments 71. Blades 70 preferably have angled inner edges 72 with a plurality of teeth 74 formed therein for biting into tree trunk 40 to assist in holding seat frame 4 in secure position and to prevent the inventive apparatus from sliding on trunk 40.

The pivotable attachment of blades 70 and the angled orientation of inner edges 72 allow blade assembly 16 to automatically adapt to tree trunks of different size, without manual adjustment. As will be apparent to those skilled in the art, blades 70 will automatically pivot inwardly when necessary to adapt to a relatively small tree and will automatically pivot outwardly when placed on a larger tree. The pivoting movement of blades 70 thus ensures that a greater number of teeth 74 will consistently be in contact with tree trunk 40 over a wide range of trunk diameters. If desired, additional gripping teeth (not shown) can also be provided in the angled rearward edges 76 of the fixed plates 68 employed in blade assembly 16.

Figure 1:
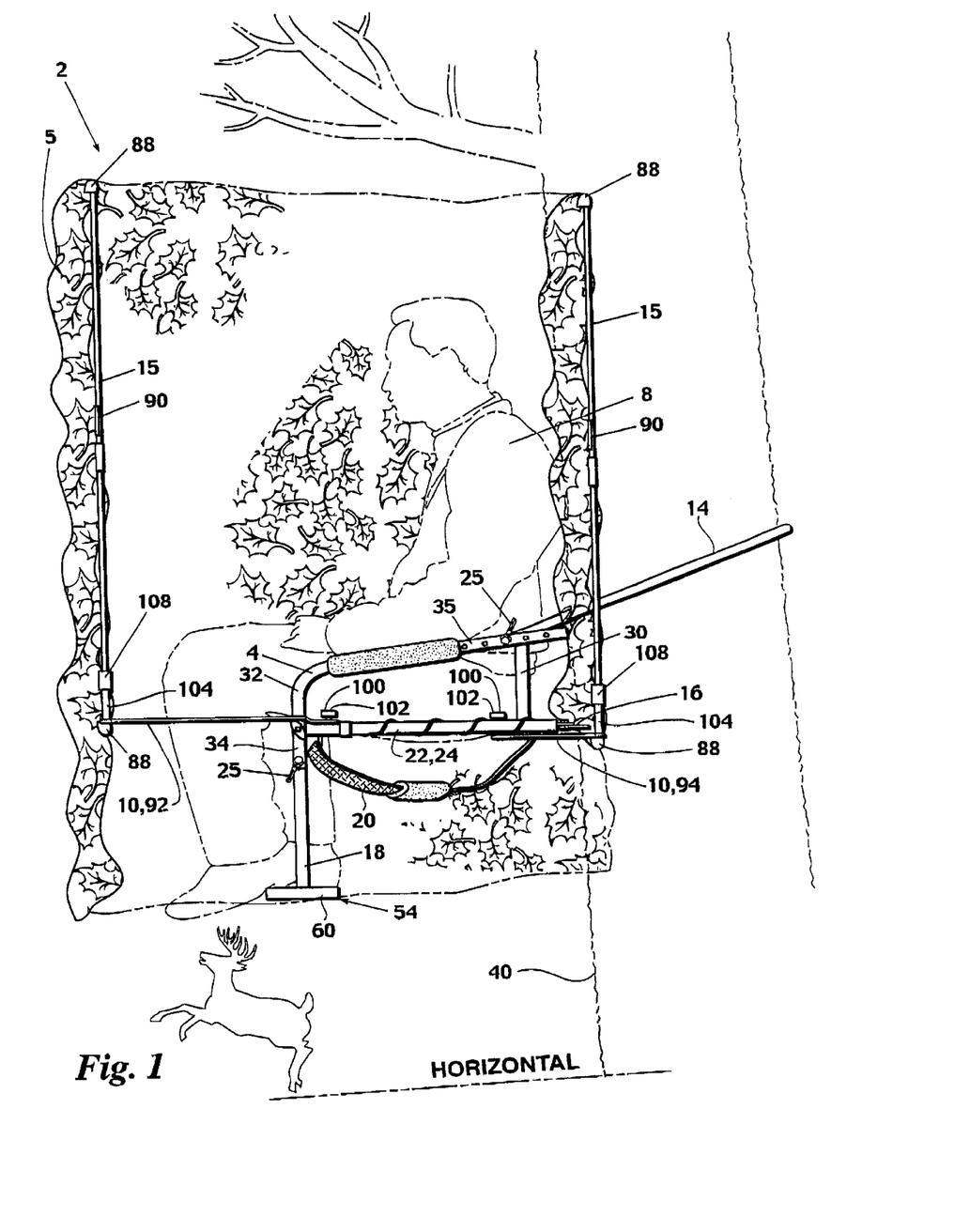
FIG. 1 provides an elevational side view of an embodiment 2 of the inventive hunting stand positioned on a tree trunk 40.

The cover 5 employed in inventive apparatus 2 can generally be any type of cover capable of at least partially concealing the user 8 from view. The cover 5 employed in inventive apparatus 2 will preferably be a soft cover of a type which is foldable and lightweight. Examples of suitable soft cover materials include, but are not limited to, netting, fabric, cloth, canvass, plastic, and combinations thereof. The cover will preferably also be of a camouflaged design, as illustrated in FIG. 1. Cover 5 will most preferably be formed of a fine net material capable of concealing user 8 while allowing a sufficient degree of visibility therethrough for spotting and/or observing the desired game.

The particular cover 5 depicted in the figures is a two-piece cover comprising: a first vertical panel or sheet 78 which extends across one side of the inventive apparatus; a second vertical panel or sheet 80 which extends across the other side of the inventive apparatus; and a plurality of Velcro™ strips, ties, or other attachment structures 82 provided at the leading ends of panels 78 and 80 for attaching or tying the panels together across the front 84 of the inventive apparatus. The two piece cover 5 is thus openable and closeable in front and, when closed, operates to conceal the user 8 in front and on each side. As will be understood by those skilled in the art, the cover 5 can also be adapted to extend rearwardly around tree trunk 5 or to otherwise conceal the user 8 from being viewed from the back 85 of inventive apparatus 2.

Figure 9:
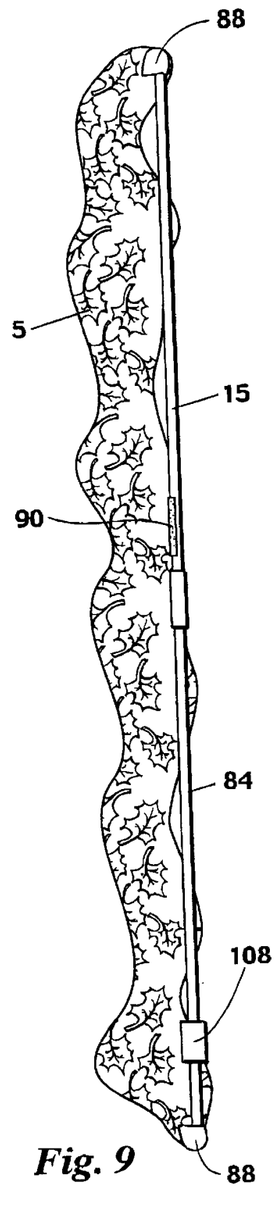
FIG. 9 depicts a soft cover 5 used in inventive hunting stand 2 with a collapsible flex rod 15 attached thereto for supporting the cover in a vertical position.
Figure 10:
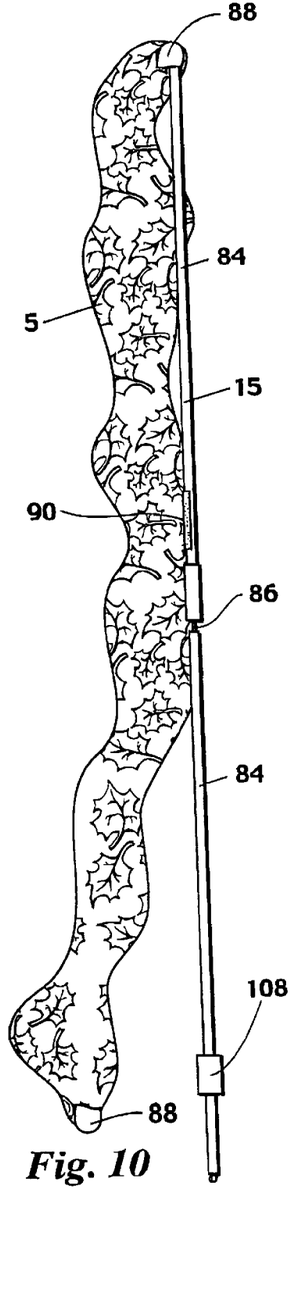
FIG. 10 depicts the collapsible flex rod 15 being partially detached from soft cover 5.
Figure 11:
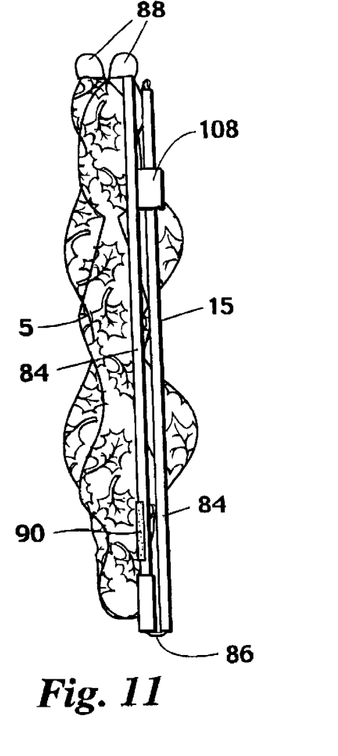
FIG. 11 depicts soft cover 5 and collapsible flex rod 15 in folded position for storage.

Each of the panels 78 and 80 of cover 5 is held in vertical position by a pair of cover attachment rods 15. As depicted in FIGS. 9–10, attachment rods 15 are preferably flexible, collapsible members of a type known in the art such that the rods 15 can be conveniently folded for storage and carrying. Collapsible flex rods 15 of this type are readily available and typically comprise two or more hollow rod segments 84 having an elastic cord or similar device 86 extending therethrough. The elastic cord 86 operates to pull the individual segments 84 together when assembled end-to-end as depicted in FIG. 9 but also allows the individual segments 84 to be pulled apart and folded, as depicted in FIGS. 10 and 11.

The panels 78 and 80 of cover 5 preferably have pouches 88 or other structures provided thereon for receiving the ends of attachment rods 15 to thus retain cover pieces 78 and 80 in their vertically extending positions for concealing the user 8. To further enhance the attachment of cover sheets 78 and 80 to flex rods 15 and to ensure that the flex rods cannot be accidentally misplaced or lost, each of the flex rods 15 is preferably permanently attached (e.g., by gluing, taping, or any other method) to the inside of cover 5 at at least one location 90.

Figure 2:
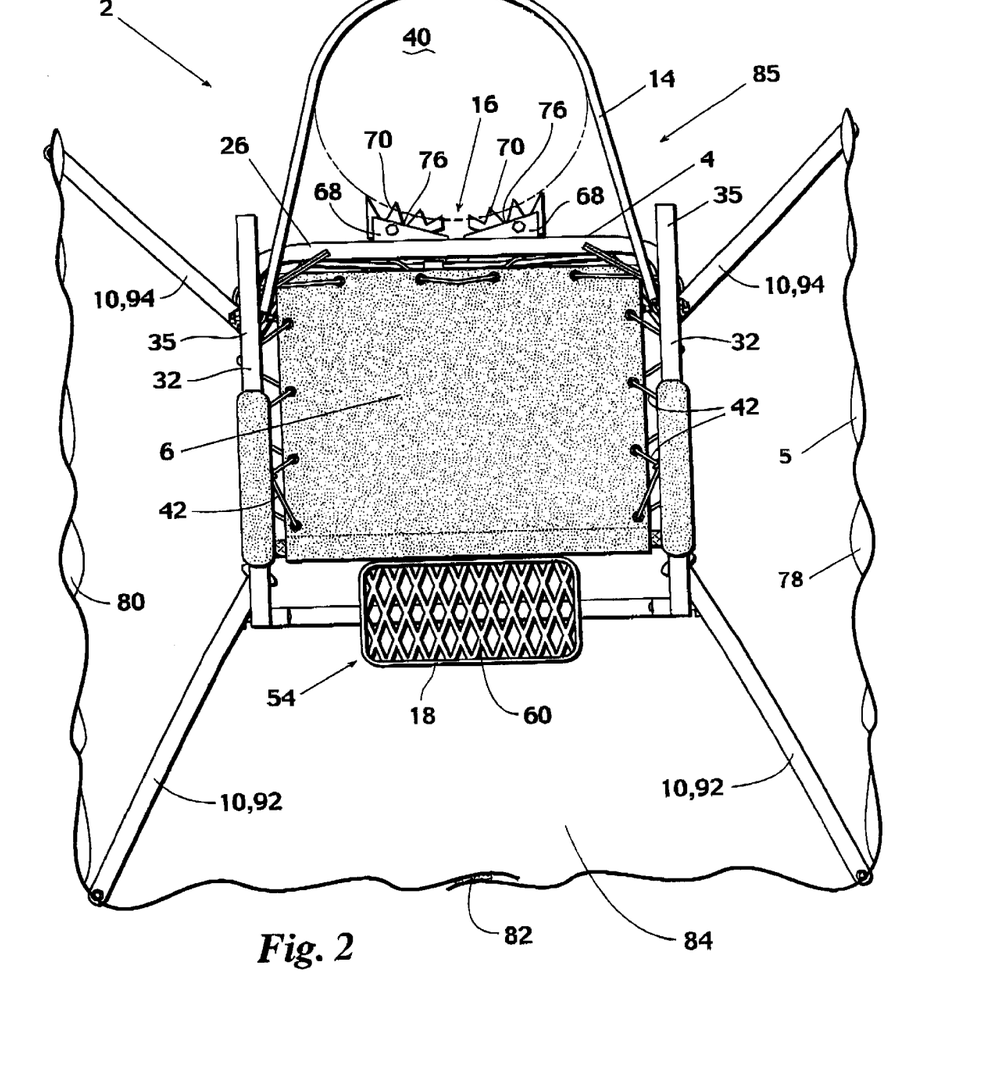
FIG. 2 provides a plan view of inventive hunting stand 2 positioned on tree trunk 40.

To deploy cover 5 and flex rods 15 in vertical operating position as depicted in FIGS. 1 and 2, the lower end portions of flex rods 15 are retained by support arms 10. Inventive apparatus 2 preferably includes a pair of front support arms 92 and a pair of rear support arms 94. All of support arms 92 and 94 are pivotably attached to the side pieces 24 of seat frame 4 so that (a) they can be pivoted outwardly to support the cover 5 in operating position around, and spaced apart from, seat frame 4 but (b) can be folded against or over seat frame 4 for carrying and storage.

To prevent the forward and rearward arms 92 and 94 from interfering with each other when pivoted to their carrying positions, the forward arms 92 are pivotably attached to the top of frame side pieces 24 and the rearward support arms 94 are pivotably attached to the bottom of frame side pieces 24. Of course, this arrangement could be reversed so that forward arms 92 are pivotably attached below and rearward arms 94 are pivotably attached above frame side pieces 24. Support arms 92 and 94 are preferably pivotably secured to seat frame 4 using bolts or similar structures 100 having enlarged knobs, wings, or other structures 102 provided thereon to allow the attachments 100 to be conveniently tightened and loosened by hand.

Each of support arms 92 and 94 preferably includes a vertical tube or other hollow structure 104 provided at the distal end thereof for receiving the lower end of a flex rod 15. The tubes 104 are preferably sized and configured such that when received in vertical tubes 104, the bottom ends of flex rods 15 will project downwardly through Me distal ends of support arms 92 and 94.

Figure 12:
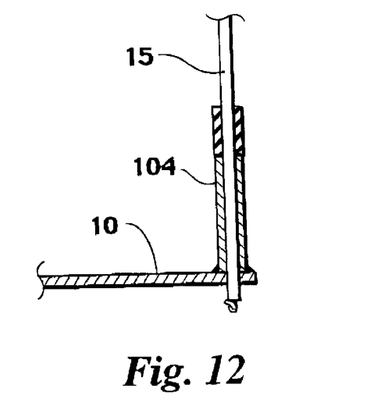
FIG. 12 depicts the lower end of flex rod 15 as supported in the end portion of an extendable support arm 13 employed in inventive hunting stand 2.

Stops 108 are provided on flex rods 15 to retain flex rods 15 in, and to prevent the flex rods from simply falling through, vertical holders 104. Stops 108 are preferably repositionable on flex rods 15 so that, by moving stops 108, the position of flex rods 15 and cover 5 with respect to seat fame 4 can be vertically adjusted Additionally, the lower ends of flex rods 15 are preferably removably receivable in cover pockets 88 so that the pockets can be placed over the lower ends of the flex rods 15 after the flex rods are inserted through holding tubes 104 as depicted in FIG. 12. The pockets 88 can then also be removed from the lower ends of flex rods 15 when taking the flex rods 15 out of holding tubes 104.

Figure 3:
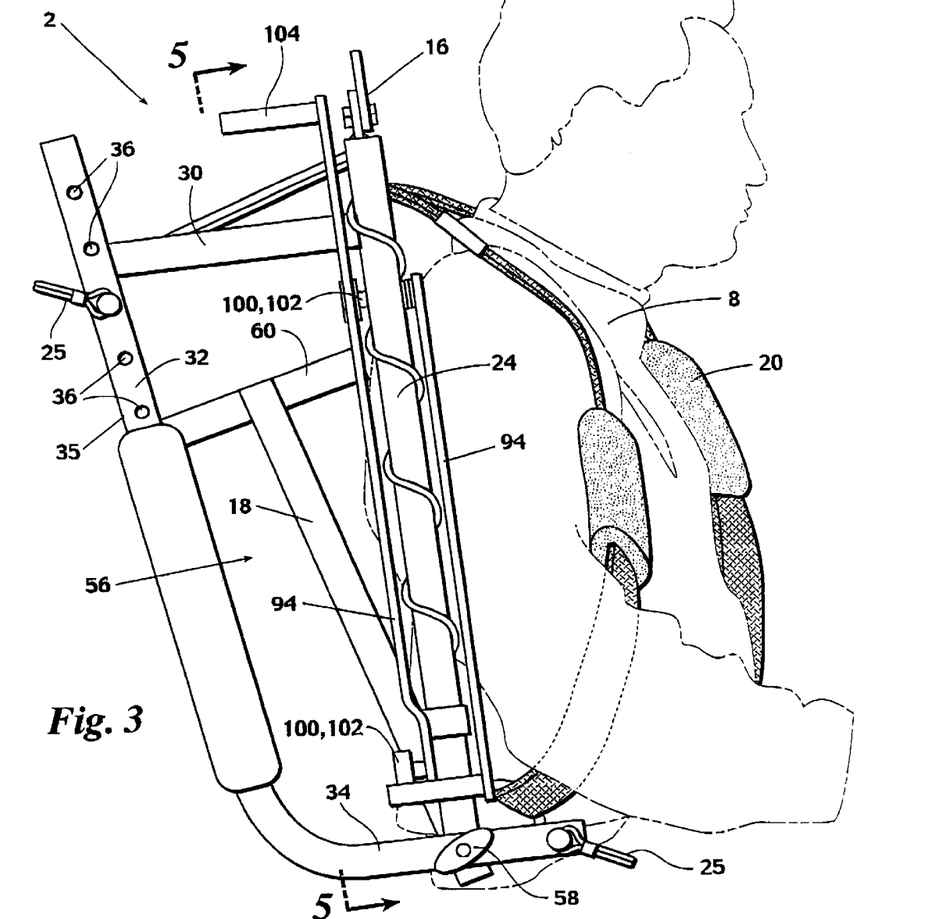
FIG. 3 provides an elevational side view of inventive hunting stand 2 in its folded position for carrying.
Figure 4:
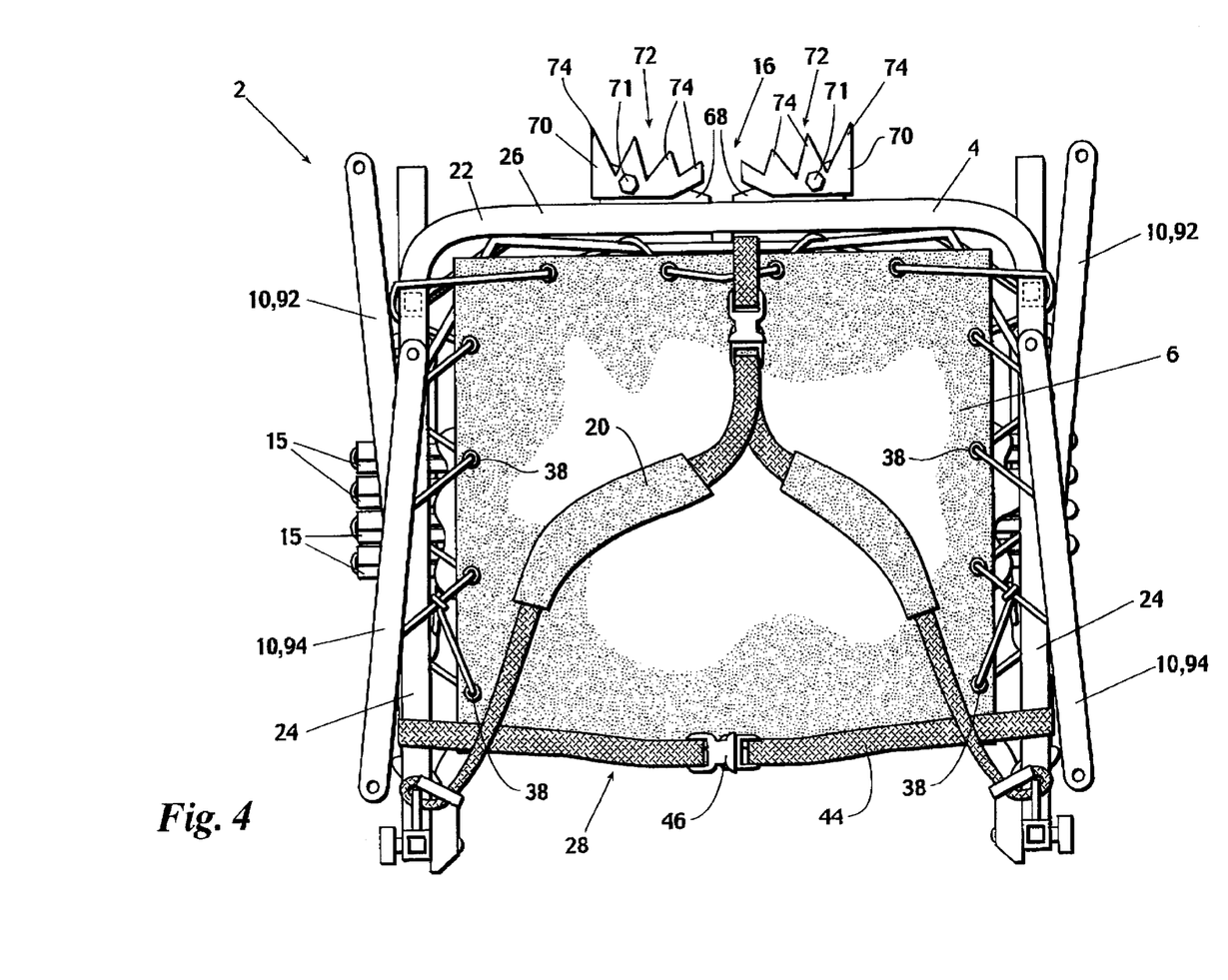
FIG. 4 provides an elevational front view of inventive hunting stand 2 in its folded position for carrying.
Figure 5:
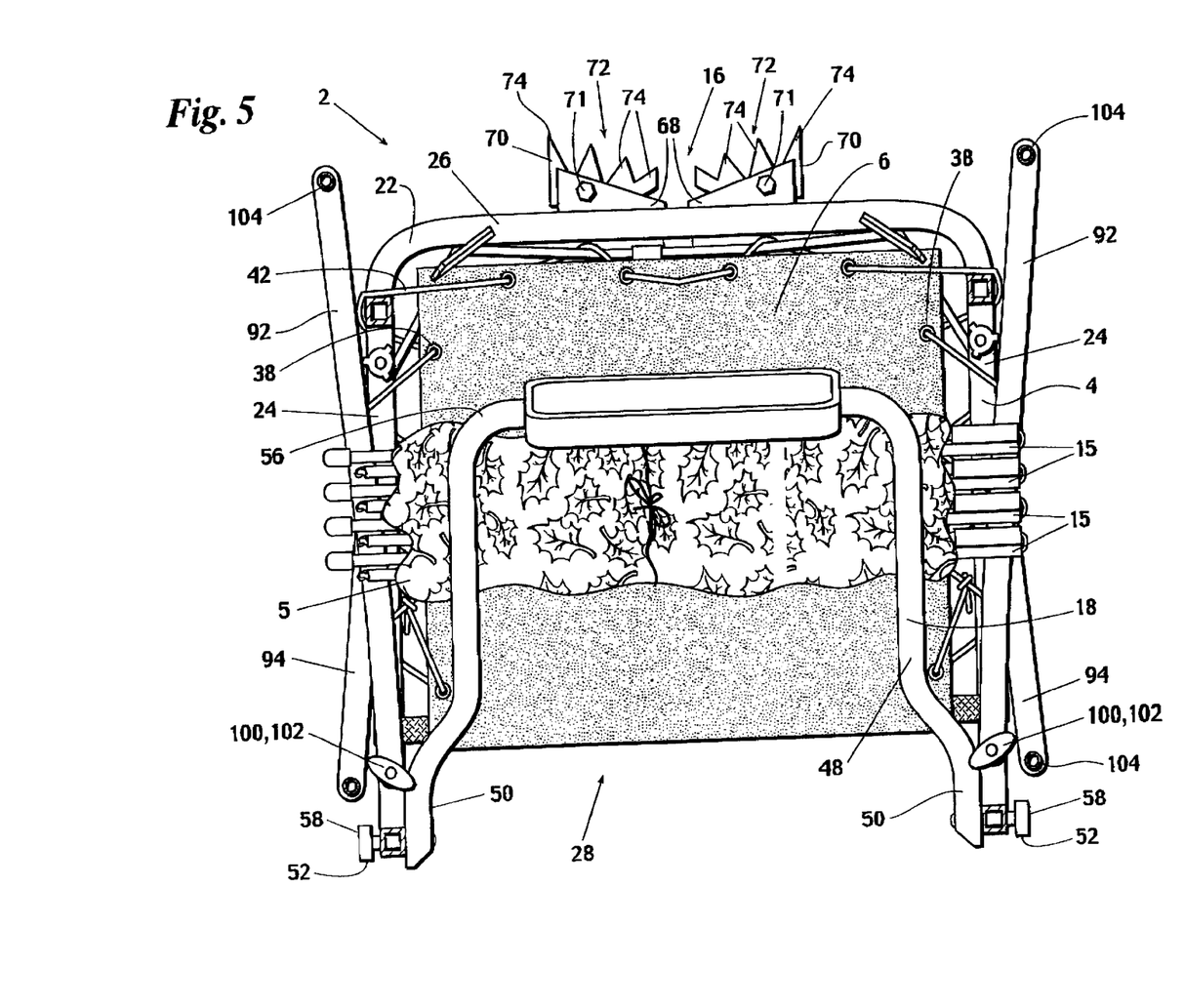
FIG. 5 provides a partially cutaway, elevational back view of inventive hunting stand 2 in its folded position as seen from perspective 5—5 shown in FIG. 3.
Figure 6:
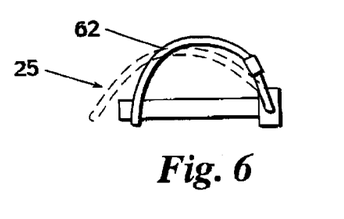
FIG. 6 provides a side view of an attachment pin 25 of a type particularly well suited for use in inventive hunting stand 2.
Figure 7:
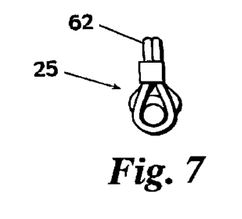
FIG. 7 provides a distal end view of attachment pin 25.
Figure 8:
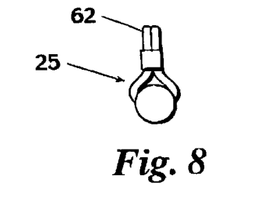
FIG. 8 provides a proximal end view of attachment pin 25.

When carrying inventive apparatus 2 to a desired location, foot rest 18 can be conveniently folded/pivoted over onto the top of seat 6 and cover support arms 92 and 94 can be folded against the sides of seat frame 4. Additionally, soft cover 5 and the flex rods 15 attached thereto can be conveniently folded and tied or otherwise secured on top of seat 6 as depicted in FIG. 5. The inventive apparatus thus forms a compact unit for carrying, as depicted in FIG. 3, using shoulder straps 20.

Figures 13, 14:
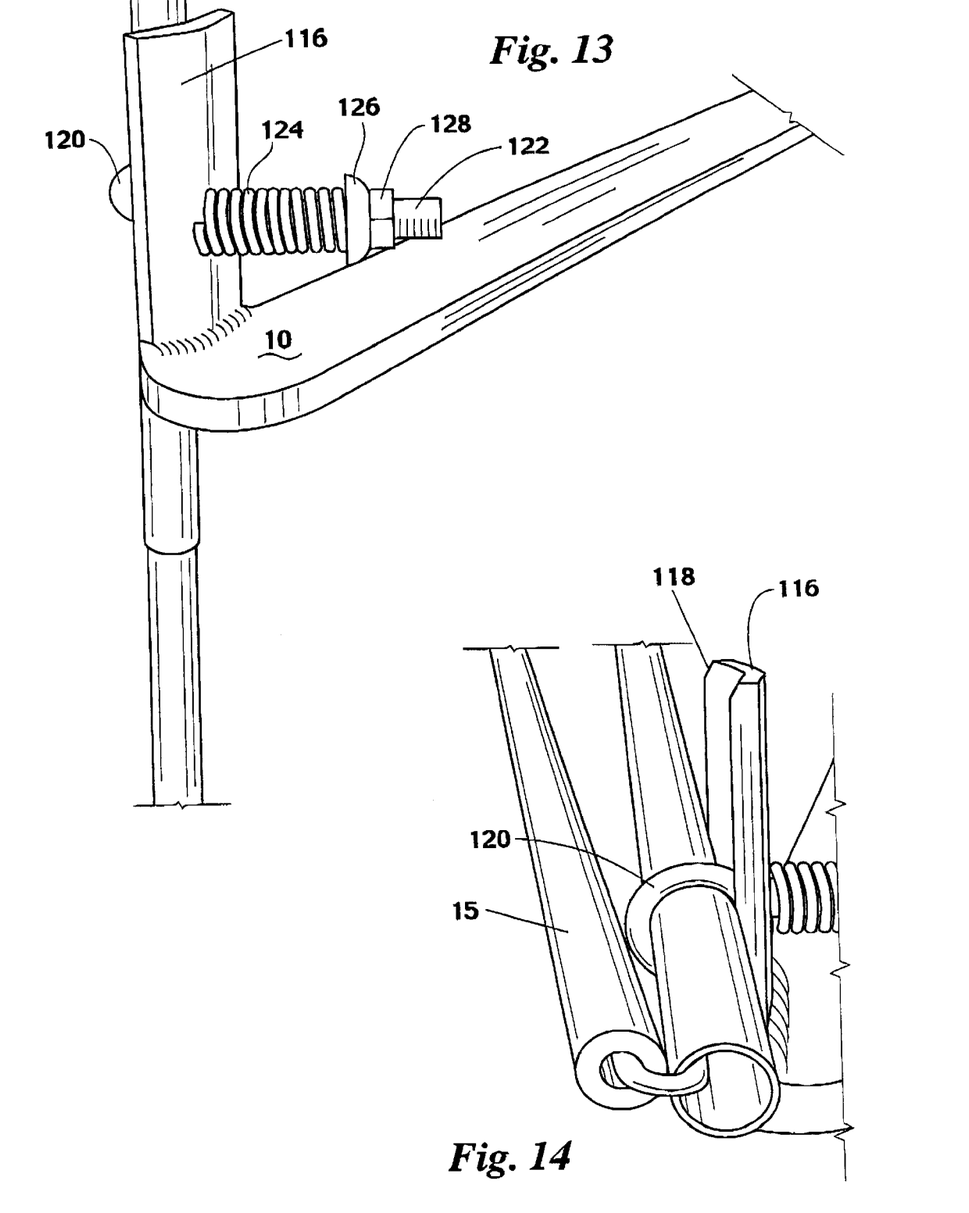
FIG. 13 provides an outside view of an alternative cover holding structure 115 which can be used in the inventive stand.
FIG. 14 provides an end view of cover holding structure 115.

An embodiment 115 of an alternative structure for securing flex rods 15 in vertical position at the ends of support arms 10 is depicted in FIGS. 13 and 14. Alternative structure 115 preferably comprises: a vertical support 116 provided at the outer end of the support arm 10; a curved or semicircular vertical surface 118 provided in the inner side of vertical support 116; a hook 120 having a threaded end 122 extending laterally through an aperture provided in vertical support 116; a biasing spring 124 positioned on threaded end 122 such that spring 124 pulls hook 120 into curved surface 118; and a cap 126 and nut 128 which retain spring 124 on threaded end 122.

The hook 120 of structure 115 is received around the flex rod 15 such that hook 120 and spring 124 pull the flex rod 15 into, and securely hold rod 15 against, the curved inner surface 118 of vertical support 116. Spring 124 can have sufficient flexibility to allow flex rod 15 to be placed in or removed from hook 120 by pressing the spring cap 126. In addition or in the alternative, spring 124 can have sufficient flexibility to allow flex rod 15 to be turned laterally, as depicted in FIG. 14, for storage and/or carrying.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A stand for hunting or photography comprising:
    a seat structure adapted to be removably positionable on a tree trunk;
    a cover removably supportable by said seat structure in a manner and having a vertical height effective for completely concealing a user when seated on said seat structure at ground level from a front view, a first side view, and a second side view;
    a plurality of arms pivotably extendable from said seat structure for supporting said cover, said arms having distal ends;
    a plurality of rods extendable from said arms, said cover being positionable on said rods for supporting said cover;
    hook structures provided at said distal ends of said aims for releasably grasping said rods; and
    springs provided on said hook structures for biasing said hook structures toward a grasping position.

2. The stand of claim 1 wherein said cover is a soft cover formed of a material effective for allowing said user to view game through said cover.

3. The stand of claim 2 where said cover is a camouflage cover.

4. The stand of claim 1 further comprising a foot rest pivotably attached to said seat structure.

5. The stand of claim 4 wherein:
    said stand further comprises a frame structure which includes said seat structure;
    said foot rest is pivotable to a position below said frame structure for use by said user; and
    said cover is vertically movable such that a lower portion of said cover can be positioned below said frame structure to conceal said user's feet from said front view, said first side view, and said second side view when said user's feet are placed on said foot rest.

6. The stand of claim 1 further comprising an attachment extendable from said seat structure for positioning around a tree trunk.

7. The stand of claim 1 further comprising a blade assembly projecting from said seat structure, said blade assembly comprising a pair of blades which will contact a tree trunk when said seat structure is positioned thereon, said blades being pivotably mounted such that said blades will automatically adapt, without manual adjustment, for placement on tree trunks of different size.

8. The stand of claim 7 wherein each of said blades includes a plurality of teeth.

9. The stand of claim 1 wherein said cover has a closeable opening.

10. The stand of claim 9 wherein said cover is a two-piece cover.

11. The stand of claim 1 wherein said rods are collapsible.

12. The stand of claim 11 wherein said rods have ends and said cover has pockets for receiving said ends.

13. The stand of claim 11 wherein said cover is permanently attached at at least one location on each of said rods.

14. The stand of claim 1 wherein said cover is vertically movable for vertically repositioning said cover with respect to said seat structure.

15. The stand of claim 14 further comprising adjustable stops provided on said rods for vertically repositioning said cover.

16. The stand of claim 1 further comprising curved surfaces at said distal ends of said arms and against which said hook structures releasably grasp said rods.

17. A stand for hunting or photography comprising:

a seat structure adapted to be removably positioned on a tree trunk;

a cover removably supportable by said seating structure in a manner and having a vertical height effective for completely concealing a user when seated on said seat structure at ground level from a front view, a first side view, and a second side view;

a plurality of arms pivotably extendable from said seat structure for supporting said cover, said arms having distal ends; and a plurality of rods extendable from said arms, said cover being positionable on said rods for supporting said cover, wherein said cover is vertically movable for vertically repositioning said cover with respect to said seat structure, and said stand further comprises adjustable stops provided on said rods for vertically repositioning said cover.

18. The stand of claim 17 wherein said rods are collapsible.

* * * * *